Patented Apr. 13, 1954

2,675,397

UNITED STATES PATENT OFFICE 2,675,397

PROCESS OF PREPARING ALKYL OR ARYL TIN COMPOUNDS

Hugh E. Ramsden, Metuchen, N. J., assignor to Metal & Thermit Corporation, New York, N. Y., a corporation of New Jersey No Drawing. Application September 23, 1950, Serial No. 186,485

8 Claims. (Cl. 260—429)

1

The present invention relates to a new and improved process of preparing an alkyl or aryl tin compound utilizing a Grignard synthesis.

Organometallic compounds, such as tetra alkyl tin, may be used, for example, as intermediates in the preparation of stabilizers for chlorinated organics and in the preparation of oil additives.

One object of the present invention is to provide a new and improved process of producing a high yield of alkyl or aryl tin compound through a Grignard synthesis.

It is believed that the formation of tetra alkyl tin through a Grignard reagent of the alkyl magnesium chloride type proceeds stepwise as follows:

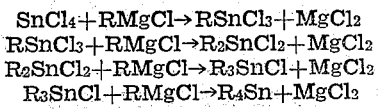

$$SnCl_4 + RMgCl \rightarrow RSnCl_3 + MgCl_2$$
$$RSnCl_3 + RMgCl \rightarrow R_2SnCl_2 + MgCl_2$$
$$R_2SnCl_2 + RMgCl \rightarrow R_3SnCl + MgCl_2$$
$$R_3SnCl + RMgCl \rightarrow R_4Sn + MgCl_2$$

In accordance with the present invention, in order to achieve substantially complete conversion of tin tetrachloride to tetra alkyl tin, high temperatures are employed. However, at these elevated temperatures, most ethers commonly employed in connection with Grignard synthesis will react with the Grignard reagent RMgCl. Even an ether having a high boiling point, as for example dibutyl ether, at the high operating temperatures contemplated will react irreversibly with alkyl magnesium halides and will thereby destroy them.

If the process is carried out by adding a high boiling inert hydrocarbon solvent and tin tetrachloride to the ether solution and subsequently distilling out the ether to permit the reaction to be conducted at high temperatures, this leads to a viscous mixture which is hard to handle.

In carrying out the process of the present invention for the production of tetra alkyl tin, magnesium and alkyl halides are mixed and reacted in the presence of a solvent ether at a low temperature of between 20° and 36° C. to produce the Grignard reagent. The active ingredients are desirably mixed in stoichiometric proportions. A suitable high boiling inert hydrocarbon solvent boiling above 36° C., such as xylene or toluene is then added and the ether removed before tin tetrachloride is added. In this way, a mixture is produced which is comparatively thin and easy to handle. After the addition of tin tetrachloride desirably in amounts based on the assumption of about 94% RMgCl and the use of an equivalent amount of tin tetrachloride, the mixture is heated to a temperature of between 20 to 150° C. and preferably above

2

100° C. An overall average of the tin yield and the alkyl yield of between 88% and 95% can be obtained by this process.

The following example illustrates a certain way in which the principle of the invention has been applied, but it is not to be construed as limiting the broader aspects of the invention.

*1st step.*—Magnesium turnings (24.0 gm.; 1 mole) were put into a three-necked flask equipped with a stirrer, reflux condenser and a graduated dropping funnel. A mixture of butyl chloride and ethyl ether (10 ml. of a total of 92.5 gm., 1 mole, dissolved in 100 ml. of absolute ether) was added with a crystal of iodine. The reaction was initiated by slight warming. After initiation, 100 ml. of ether was added and the remainder of the butyl chloride-ether mix was added as rapidly as possible to maintain rapid reflux. After the addition was complete, the mixture was heated to gentle reflux for ½ hour to 1 hour at a temperature of about 36° C.

*2nd step.*—Absolute toluene (100 ml.) was then added and heating was continued at the temperatures of about 36° C. to 110° C. until the ether was removed by distillation. Tetrachloride tin (27.2 ml., 0.235 mole in 100 ml. of absolute toluene) was then added rapidly and the temperature increased. After two to three hours of heating and after the distilling head vapor temperature had reached 110° C., the heating was stopped and the mixture was cooled. The cooled mix was filtered and the filter cake was washed with toluene. Washings and filtrate were stripped of toluene and the organotins were fractionated. The product was mainly Bu₄Sn with small amounts of Bu₃SnCl and Bu₂SnCl₂. The theoretical yield was 81.5 grams (34.3% Sn content). The actual yield was 77 grams (34.3% Sn content, 0% Cl). The actual yield was 94.6% of the theoretical yield based on the Sn available and 89.0% based on the butyl group available. The overall or the average of the tin yield and the butyl yield was between 88% and 95%.

In the process described, any alkyl halide aside from that described that can undergo a Grignard reaction may be employed. The process has also application to the manufacture of aryl tin compounds. Where so applied, aryl bromides or aryl iodides may be employed in the first step described to produce the Grignard reagent ArMgX.

While the invention has been described with particular reference to a specific embodiment, it is to be understood that it is not to be limited thereto, but is to be construed broadly and re-

What is claimed is:

1. The method of producing an organotin compound, which comprises preparing a Grignard reagent in the presence of a solvent ether, adding an inert hydrocarbon solvent having a boiling point substantially higher than that of the solvent ether, removing the solvent ether, adding tin tetrachloride, and heating the mixture to an elevated temperature.

2. The method of producing an organotin compound, which comprises preparing a Grignard reagent in the presence of a solvent ether, adding an inert hydrocarbon solvent having a boiling point substantially higher than that of the solvent ether, removing the solvent ether by distillation, adding tin tetrachloride, and heating the mixture to a temperature substantially higher than the distillation temperature of the solvent ether to effect conversion of the tin tetrachloride to an organotin compound.

3. The method of producing an organotin compound, which comprises preparing a Grignard reagent in the presence of a solvent ether having a boiling point below 36° C., adding an inert hydrocarbon solvent having a boiling point substantially higher than 36° C., removing the solvent ether by distillation, adding tin tetrachloride and heating the mixture to a temperature above 36° C. to effect conversion of the tin tetrachloride to an organotin compound.

4. The method of producing an organotin compound, which comprises preparing a Grignard reagent in the presence of a solvent ether having a boiling point between 20° and 36° C., adding an inert hydrocarbon solvent having a boiling point substantially higher than 36° C., removing the solvent ether by distillation, adding tin tetrachloride, and heating the mixture to a temperature between 20° and 150° C.

5. The method of producing an organotin compound, which comprises preparing a Grignard reagent in the presence of a solvent ether having a boiling point between 20° and 36° C., adding an inert hydrocarbon solvent having a boiling point substantially higher than 36° C., removing the solvent ether by distillation, adding tin tetrachloride, and heating the mixture to a temperature above 100° C.

6. The method of producing a tetra alkyl tin compound which comprises preparing an alkyl magnesium halide in the presence of a solvent ether having a boiling point between 20° and 36° C., adding an inert hydrocarbon solvent of the class consisting of xylene and toluene, removing the solvent ether by distillation, adding tin tetrachloride, and heating the mixture to a temperature above 100° C. long enough to effect substantially complete conversion of the tin tetrachloride to tetra alkyl tin.

7. The method of producing tetra butyl tin, which comprises preparing butyl magnesium chloride in the presence of ethyl ether as a solvent, adding an inert hydrocarbon solvent having a boiling point substantially higher than 36° C., removing the ethyl ether by distillation, adding tin tetrachloride and heating the mixture to a temperature above 100° C.

8. The method of producing tetra butyl tin, which comprises preparing butyl magnesium chloride in the presence of ethyl ether as a solvent, adding toluene, removing the ethyl ether by distillation, adding tin tetrachloride and heating the mixture to a temperature above 100° C.

References Cited in the file of this patent

UNITED STATES PATENTS

| Number | Name | Date |
|---|---|---|
| 2,066,198 | Buc | Dec. 29, 1936 |

OTHER REFERENCES

Goddard et al., Textbook of Inorganic Chemistry, vol. 11, part I (1928), pages 301–302.